United States Patent [19]

Leighton et al.

[11] 4,346,008
[45] Aug. 24, 1982

[54] ROTARY DRUM FILTER

[75] Inventors: Milton D. Leighton, Florham Park; Douglas G. Ryan, Rockaway, both of N.J.

[73] Assignee: Exxon Research & Engineering Co., Florham Park, N.J.

[21] Appl. No.: 216,447

[22] Filed: Dec. 15, 1980

[51] Int. Cl.³ ............................................. B01D 33/08
[52] U.S. Cl. ................................... 210/395; 210/404
[58] Field of Search .............. 210/784, 392, 395, 396, 210/402, 404

[56] References Cited

U.S. PATENT DOCUMENTS

| | | | |
|---|---|---|---|
| 2,321,230 | 6/1943 | Mills et al. ........................ | 210/202 |
| 2,755,938 | 7/1956 | Alcock .............................. | 210/392 |
| 3,262,575 | 7/1966 | Aconsky ........................... | 210/395 |
| 4,032,442 | 6/1977 | Peterson ........................ | 210/393 X |
| 4,157,301 | 6/1979 | Wegener ........................... | 210/404 |
| 4,309,288 | 1/1982 | Ryan ................................. | 210/395 |

Primary Examiner—Thomas G. Wyse
Attorney, Agent, or Firm—Edward H. Mazer

[57] ABSTRACT

An improved rotary drum filter is described. The filter includes a liquid collection means communicating with at least a plurality of fluid conduits. The collection means collect and discharge residual liquid remaining in the fluid conduits during each rotation of the filter drum to decrease the erosive effects of the residual liquid on the filter cloth.

14 Claims, 3 Drawing Figures

ROTARY DRUM FILTER

BACKGROUND OF THE INVENTION

This invention relates to an improved continuous rotary drum filter means. More specifically, the subject invention is related to a continuous rotary drum filter for the separation of petroleum liquids, such as lube oils, from solids, such as paraffins.

The separation of mixtures of compounds can be accomplished by various unit operations including distillation, solvent extraction and fractional crystallization. Fractional crystallization is particularly well suited to the purification of many mixtures economically in a one-stage operation. Frequently, the crystallization operation is combined with another unit operation to produce an improved separation process. In petroleum processing, operations fractional crystallization is often utilized to separate waxy compounds from the lube oil fraction. Frequently, a solvent is added to the mixture to provide more favorable conditions for crystal growth and to dilute the resultant chilled slurry to thereby permit continuous oil-wax separation.

One type of filter particularly well suited to fractional crystallization, in general, and wax-lube oil separation, in particular, is the rotary drum filter. In this type filter, a filter drum continuously rotates within a filter vat containing the mixture to be separated. In one phase of the rotation, vacuum is applied to the filter drum causing a major portion of filtrate to be drawn through the filter cloth and fluid conduits, while the solids and a minor amount of filtrate are trapped by the filter cloth and build up to form a cake. A liquid solvent wash liquid is often then sprayed over the cake and drawn through the filter cloth and conduits to remove additional quantities of filtrate from the cake. During another phase of the rotation, high velocity gas is passed outwardly through the fluid conduits to purge the liquid filtrate and/or solvent and break the filter cake away from the cloth. During this purge cycle, liquid adhering to the walls of the conduits may be directed against sections of the filter cloth by the high velocity gas, thereby causing erosion of the filter cloth. Filter cloth replacement necessitates complete shutdown of the filter and is relatively expensive, since rotary filters frequently are thirty feet or more in length.

One method for minimizing the erosive effects of the liquid on the filter cloth has been to have an elongated purge cycle in which the lead fluid conduit in the direction of flow is evacuated while the lag conduit, or conduit immediately following the lead conduit, is purged with high velocity gas. Liquid purged out of the lag pipe is directed into the lead pipe before it can strike the filter cloth. At a predetermined point in the rotation, the vacuum is discontinued and the purge gas and any remaining liquid is directed outwardly. Extension of the time period during which the combination of purge and evacuation is accomplished would decrease the amount of liquid remaining in the lag fluid conduit when evacuation of the lead fluid is discontinued. However, this would require a decrease in the rotational speed of the filter drum and/or a decrease in the other filter drum cycle times. Either of these methods thus would decrease the filtration capacity of the unit.

Yet another method of decreasing the erosive effects of the liquid would be to use a thicker or more erosion-resistant filter cloth. Use of a thicker filter cloth would increase the filter cloth cost and also increase the tendency of the filter cloth to bow while also decreasing the filter capacity. In addition, the thicker the filter cloth, the more difficult it is to remove the wax fines from the cloth. Use of a more erosion-resistant filter cloth may not be advantageous, since a more erosion-resistant cloth may not have desirable filter cake discharge characteristics.

Other methods for decreasing the amount of liquid blown from the fluid conduits onto the filter cloth have been directed at the addition of liquid storage chambers by the use of a series of capped pipes or the like attached to the fluid conduits to trap the discharged liquid. U.S. Pat. Nos. 2,321,230; 3,262,575; and 4,032,442 all are directed at individual liquid chambers attached to each fluid conduit. These devices have several disadvantages. Since the volume of residual liquid which may remain in each fluid conduit may be significant, these fluid chambers each should have a large capacity to trap all the liquid discharged. However, entrapping this residual liquid may result in undesirable deflection of the chambers unless relatively complex support mechanisms are provided. In addition, venting of the aforementioned devices may not be sufficient, resulting in incomplete drainage of the chambers during filter drum rotation. In addition, the aforementioned devices may not be easily retrofitted to rotary drum filters presently in use.

Accordingly, it is desirable to produce a modified rotary filter in which erosion of the filter cloth by entrained liquid is reduced or eliminated without decreasing the filter throughput or increasing the cost of replacement filter cloths.

It is also desirable to have a rotary filter design which effectively traps residual liquid and which is relatively inexpensive and reliable.

It is also desirable to have a rotary filter design which is easily adaptable to rotary filters currently in use for removing entrained liquid.

SUMMARY OF THE INVENTION

The subject invention is directed at an improved rotary filter of the type comprising:

(a) a filter vat adapted to contain a filterable slurry;

(b) a rotatable filter drum at least partially disposed in said filter vat and adapted to accept a filter cloth, said drum having circumferential openings therein in substantial alignment with fluid conduits disposed in said drum;

(c) means to rotate said drum in said filter vat;

(d) fluid conduits disposed in said drum in substantial alignment with the circumferential openings in said drum, said conduits communicating with a valve means and with a liquid collection means; and (e) a valve means communicating with said fluid conduits for regulation of the fluid flow through said conduits and through the circumferentially disposed openings in said filter drum, the improvement which comprises a vented liquid collection means communicating with a plurality of said fluid conduits, whereby, during one phase of the rotation of said filter drum, liquid is directed from said fluid conduits into said liquid collection means, and, during another phase of the rotation of said filter drum, the liquid is removed from said liquid collection means. In a preferred embodiment of the subject invention the liquid collection means comprises a pair of liquid collection means, one being disposed at each end of the filter drum. Each collection means comprises a series of circumferentially disposed chambers, each chamber communicating with the terminus of a lag fluid conduit and having a venting means.

DETAILED DESCRIPTION OF THE INVENTION

Figure 1:
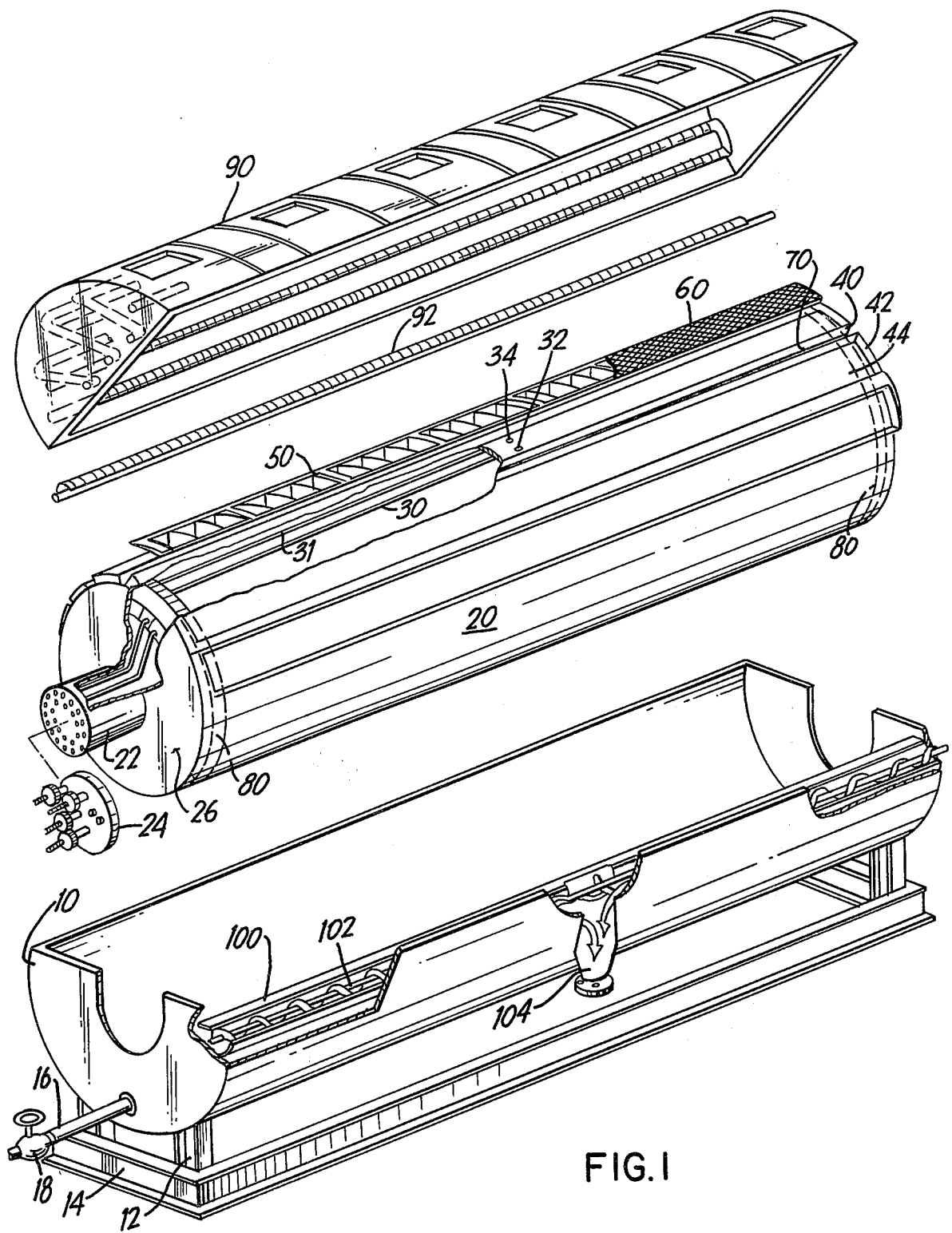
FIG. 1 is an exploded isometric drawing of a typical rotary filter incorporating the subject invention.

Referring to FIG. 1, an exploded, simplified isometric assembly drawing of a typical rotary drum filter is shown. The filter includes a filter vat, generally indicated as 10 and a filter drum generally indicated as 20. Vat 10, having a substantially semicylindrical shape is supported by columns 12 above base 14. An inlet 16 communicates with vat 10 and with the source of the slurry to be separated (not shown). A level controller (not shown) usually is added to control the level of slurry in vat 10 by regulating valve 18 in inlet 16. A filter hood 90 having an overall semicylindrical shape has a plurality of perforated spray headers or drip pipes 92 disposed therein parallel to the axis of rotation of drum 20 to wash the wax cake formed in the drum as hereinafter described. Filter drum 20 is of a generally overall cylindrical shape having a diameter slightly less than that of the diameter of vat 10, such that drum 20 is rotatable about its axis in vat 10 on a pair of trunions 22. A series of uniformly spaced channel sections 40 extend outwardly from the curvilinear surface of drum 20 parallel to the axis of rotation. Terminal sections 42 disposed near the ends of drum 20 connect each section 40 to an adjacent channel section, to thereby define a series of segments 44 circumferentially disposed around drum 20. Each segment 44 has two series of circumferential openings through drum 20 evenly spaced along substantially the entire axial length of each segment to form circumferential rows with one series of openings 32 in general alignment with fluid conduit 30 and with the other series of openings 34 in general alignment with fluid conduit 31. In each segment 44 the leading opening 32 in the direction of rotation hereinafter is referred to as the lead opening while the immediately adjacent trailing opening 34 is referred to as the lag opening. Similarly, fluid conduit 30, communicating with opening 32, is referred to as the lead fluid conduit, while fluid conduit 31 communicating with lag opening 34 is referred to as the lag fluid conduit. One of the pair of trunions 22 has a plurality of holes each of which communicates with lead and lag fluid conduits 30, 31, respectively and with trunion valve means 24 to perform varying operations during each revolution of drum 20 as described hereinafter. The other trunion communicates with a conventional drum rotation means (not shown) to rotate drum 20 in vat 10. Each conduit 30, 31 extends along substantially the entire axial length of drum 20 terminating in a liquid collection means 80.

A means for removing the filter cake from filter cloth 60 such as doctor knife 100 disposed in a compartment in vat 10 is shown discharging the filter cake into a screw conveyor 102 which directs the filter cake out of vat 10 through outlet 104. Within each segment 44 is disposed a filter grid 50 to maintain filter cloth 60 spaced apart from drum 20. Filter cloth 60 is stretched over channel sections 40 and grids 50 and is retained in position by caulking bar 70 compressingly inserted between channel sections 40 and by circumferential wires (not shown).

It has been found that the liquid remaining in lag conduit 31 tends to be blown to the ends of the conduit when blow gas is passed outwardly through the conduit while flow to conduit 30 simultaneously is blocked by means of trunion valve 24. Accordingly, liquid collection means 80, shown in FIG. 2, somewhat simplified for clarity, should be in communication with at least a plurality of lag conduits 31, preferably in communication with a majority of lag conduits 31, and more preferably in communication with all lag conduits 31 to decrease the erosive effects of residual liquid on filter cloth 60 and to prevent residual liquid from being blown back into the filter cake. Collection means 80 preferably is disposed within drum 20 in communication with the termini of lag fluid conduits 31. Although it is within the contemplation of this invention that only one collection means 80 is utilized, it is anticipated that a plurality of collection means typically will be used, preferably having a substantially annular or toroidal configuration. In the preferred embodiment described herein, a pair of collection means 80 having an overall toroidal configuration are utilized, one disposed in drum 20 adjacent to each drum wall 26. Collection means 80 may be a separate body mounted in drum 20, or it may be formed by partitioning the internal area adjacent to wall 26 of drum 20. Where existing filters are to be adapted to use of the subject invention, there may not be sufficient room between the outermost circumferential rows of openings 32, 34 and drum walls 26 for collection means 80. In that event, a sufficient number of rows of circumferential openings adjacent to each end may be blocked off to provide sufficient room for installation of collection means 80, and lag conduits 31 may be modified to communicate with collection means 80 as hereinafter described.

The overall configuration of collection means 80 will be dependent upon the design of the filter means, the required liquid storage capacity in the collection means, and the space available within the filter drum 20 for installing the collection means. To simplify construction, collection means 80 preferably is of an overall annular shape, more preferably of an overall toroidal configuration.

Figure 2:
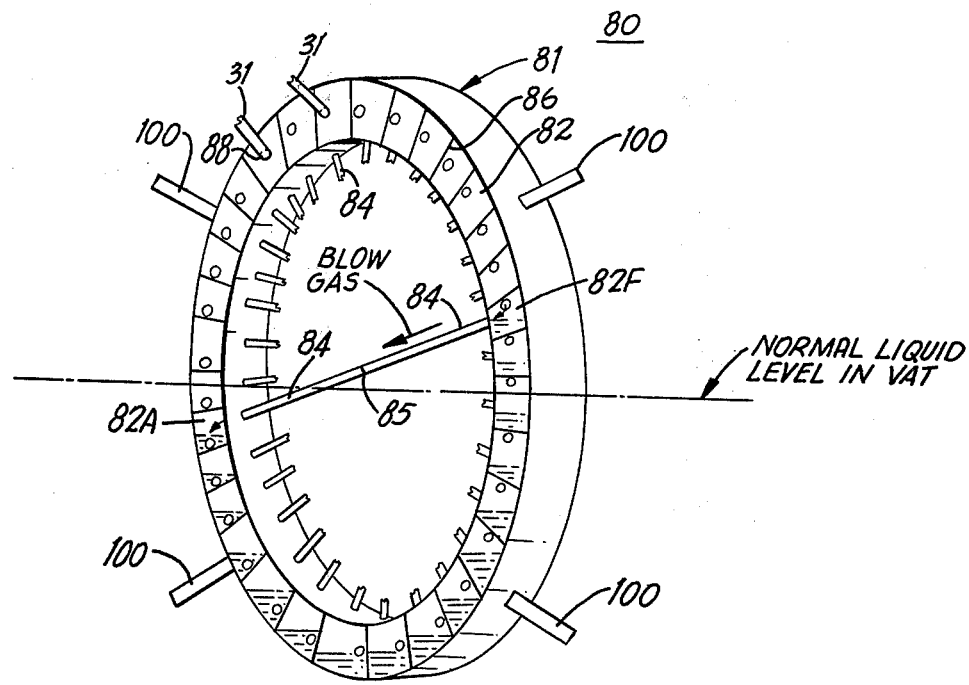
FIG. 2 is an enlarged simplified isometric view showing fluid conduits and the liquid collection means of the subject invention.

FIG. 2 shows collection means 80 comprising a generally toroidal vessel 81 having individual chambers 82, each chamber separated from the adjacent chamber by a partition 86. Each chamber 82 communicates with a terminus of lag fluid conduit 31 through chamber opening 88. Each chamber 82 also is provided with a vent means such as vent conduit 84 to permit alternate gas and liquid residence in each chamber 82 during each revolution of drum 20. Chambers 82 should be sized such that each chamber will contain all the residual liquid discharged through the respective terminus of lag fluid conduit 31 during each revolution by the blow gas. It may be desirable to brace vessel 81 to drum 20 by radially extending supports 100 communicating with vessel 81 and drum 20.

The method selected for venting chamber 82 is not critical provided that the venting is sufficient during all phases of filter operation. Adequate venting is particularly important in allowing gas to displace liquid from each chamber when the chamber is submerged in the slurry. One particularly effective method for venting individual chambers 82 is to connect each chamber, such as chamber 82A, to the generally diametrically opposite chamber such as chamber 82F, via the vent conduits 84 joined at 85, although other means for venting chambers 82 also may be effective. In this Figure, sections of all lag fluid conduits 31 and all but two vent conduits 84 have been omitted for clarity.

A typical filter for the separation of wax from lube oil has a filter drum 20, thirty feet in length and eleven and one-half feet in diameter. This drum has an effective filtering area of approximately 1000 square feet with thirty lag fluid conduits 31, 2½ inches in diameter. In this embodiment, liquid collection means 80 may comprise two toroids fabricated from eight inch O.D. schedule 40 type 316 stainless steel approximately nine feet in diameter. The rings are partitioned into 30 substantially equivalent chambers 82, each chamber communicating with the terminus of a lag fluid conduit 31 and with the diametrically opposite chamber via vent conduit 84, which may be fabricated from small diameter thin-walled metal tubing, such as half inch diameter stainless steel tubing. Preferably tubing which is somewhat flexible should be used, since all vent conduits 84 will pass near the center of vessel 81.

Figure 3:
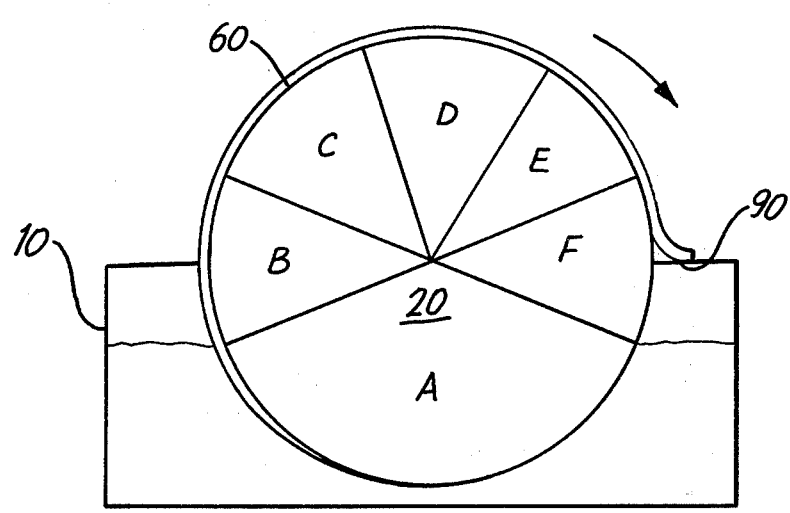
FIG. 3 is a simplified cross-sectional view of a rotary filter indicating the operations performed during each rotation of the drum.

The sectors of FIG. 3 illustrate the varying operations performed simultaneously by a typical rotary filter such as that of FIG. 1, which incorporate the subject invention. When a point on filter cloth 60 is in a position included within sector A, that point is under vacuum. Filtrate is drawn through filter cloth 60, circumferential openings 32 and 34 and fluid conduits 30 and 31, respectively, into a filtrate storage facility (not shown). The solid wax crystals are retained on filter cloth 60 and buildup to form a wax filter cake. Towards the end of this phase, blow gas passes from chamber 82F through vent conduit 84 into chamber 82A to pressurize chamber 82A momentarily, thereby forcing liquid in chamber 82A out of the chamber through lag conduit 31 into filtrate storage. As each point on filter cloth 60 rotates to sector B, that point rises out of the slurry. Vacuum continues to be applied to sector B to continue to draw any remaining filtrate through circumferential openings 32 and 34 and fluid conduits 30 and 31, respectively, thereby further drying the filter cake. Any remaining liquid in chamber 82A is forced from the chamber through lag conduit 31 by the combination of the pressure in chamber 82A and the vacuum in the lag conduit. When the point rotates still further to a position within sector C, valve means 24 continues evacuation of fluid conduits 30 and 31, while a wash fluid is sprayed through spray headers 92 in filter hood 90 to wash filtrate from the wax cake. At least a portion of the filtrate remaining on the wax cake as well as wash fluid passes through the wax cake, filter cloth 60, circumferential openings 32, 34 and fluid conduits 30, 31, respectively, for removal from the filter. The wash fluid generally comprises a liquid which is miscible with the filtrate but not with the solids of the filter cake. In the separation of lube oil from wax, this wash liquid frequently is a mixture of ketones or ketone/toluene. When the point on filter cloth 60 rotates to the position shown by sector D, the filter cake is again dried by discontinuing external wash flow and continuing to apply vacuum to sector D, which pulls wash from the wax cake through circumferential openings 32, 34, and fluid conduits 30, 31, respectively. As the point rotates still further to sector E, purge gas, typically having a velocity of about 100 feet/second, is supplied to lag fluid conduit 31 communicating with lag opening 34 while the immediately adjacent lead opening 32 continues to be maintained under vacuum. This serves to cause some of the liquid remaining in lag fluid conduit 31 communicating with lag opening 34 to flow into fluid conduit 30 communicating with lead opening 32. As the point rotates still further to sector F, lead opening 32 is no longer evacuated. The purge gas which is called blow gas at this point, forces at least a portion of the remaining liquid in fluid conduit 31 into a chamber 82F of liquid collection means 80. Blow gas also passes through vent conduit 84 to pressurize the diametrically opposite chamber 82A as previously described. Blow gas also contacts filter cloth 60, causing the cloth to billow out slightly, thereby facilitating the subsequent removal of the cake by doctor knife 100. It should be noted that if liquid collection means 80 were not installed in the subject filter, liquid remaining in conduits 31 would be conveyed by the high velocity purge gas against filter cloth 60 causing the cloth to erode, particularly at the ends of drum 30 where the liquid tends to collect.

The relative length of phases A-F is shown in FIG. 5 for a typical filter. It is to be understood that the length of time that any given location on filter cloth 60 spends in a particular phase may be adjusted by varying the size of the sector devoted to that phase and by varying the rate of rotation of drum 20. In addition to decreasing the erosion rate of the filter cloth, use of the subject invention also may permit a decrease in the time required for phases E and/or F, thereby permitting an increase in the filtration time in each revolution.

While the invention has been described with respect to a specific embodiment, it will be understood that this disclosure is intended to cover any variations, uses and adaptations of this invention including such departures from the present disclosure as come within known or customary practice in the art to which the invention pertains and as fall within the scope of the invention.

What is claimed is:

1. In a rotary filter means of the type comprising:
   (a) a filter vat adapted to contain a filterable liquid-solid slurry;
   (b) a rotatable filter drum at least partially disposed in said filter vat and adapted to accept a filter cloth, said drum having circumferential openings therein in substantial alignment with fluid conduits disposed in said drum;
   (c) means to rotate said drum in said filter vat;
   (d) fluid conduits disposed in said drum in substantial alignment with the circumferential openings in said drum, said conduits communicating with a valve means and with a liquid collection means; and
   (e) a valve means communicating with said fluid conduits for regulation of the fluid flow through said conduits and through the circumferentially disposed openings in said filter drum; the improvement which comprises a vented liquid collection means having chambers therein communicating with said fluid conduits said chambers adapted to collect liquid from said fluid conduits during one phase of the rotation of said filter drum and adapted to permit the removal of the liquid during another phase of the rotation of said filter drum.

2. The rotary filter means of claim 1 wherein the fluid conduits comprise lead fluid conduits and lag fluid conduits and wherein said liquid collection means communicates with at least a plurality of the lag fluid conduits.

3. The rotary filter means of claim 2 wherein the liquid is removed from said collection means through the fluid conduits.

4. The rotary filter means of claim 3 wherein said liquid collection means comprises a pair of collection means, one disposed adjacent to each end of the filter drum.

5. The rotary filter means of claim 4 wherein said liquid collection means communicates with at least a majority of the lag fluid conduits.

6. The rotary filter means of claim 5 wherein said liquid collection means communicates with every lag fluid conduit.

7. The rotary filter means of claim 6 wherein each of said liquid collection means includes a generally annular vessel having a plurality of circumferentially disposed chambers therein.

8. The rotary filter means of claim 6 wherein the vessel is substantially toroidal having a plurality of circumferentially disposed chambers therein.

9. The rotary filter means of claim 8 wherein each of said chambers communicates with a terminus of a lag fluid conduit.

10. The rotary filter of claim 9 wherein the vented liquid collection means includes venting means communicating with each of said chambers.

11. The rotary filter means of claim 10 wherein said venting means communicates with a source of gas, the gas displacing at least a portion of the liquid in each of said chambers when each of said chambers is disposed in the slurry.

12. The rotary filter means of claim 11 wherein each of said venting means communicates with the venting means for a generally diametrically opposed chamber, whereby blow gas injected into one chamber passes through said chamber and through said venting means for said generally diametrically opposed chamber to vent said generally diametrically opposed chamber.

13. The rotary filter means of claim 11 wherein the rotary filter means further includes a filter cloth disposed over the circumferential openings on the filter drum, and means for removing filter cake formed on the filter cloth, whereby, during one phase of each rotation of the filter drum slurry is drawn onto the filter cloth with at least a portion of the filtrate passing through the openings into the fluid conduits while solids form a filter cake on the filter cloth, and during another phase of each rotation, the filter cake is removed from the filter cloth.

14. In a rotary filter means of the type comprising:
(a) a filter vat adapted to contain a filterable slurry;
(b) a rotatable filter drum at least partially disposed in said filter vat, said drum having circumferential lead and lag openings disposed therein in substantial alignment with lead and fluid conduits disposed in said drum;
(c) means to rotate said drum in said filter vat;
(d) lead and lag fluid conduits disposed in said drum in substantial alignment with the respective lead and lag circumferential openings in the drum, said conduits communicating with a valve means;
(e) a valve means communicating with said fluid conduits for regulation of the fluid flow through said conduits and through the circumferentially disposed openings in said filter drum;
(f) a filter cloth disposed over the circumferential openings in said filter drum;
(g) means for removing filter cake from the filter cloth, whereby during one phase of each rotation of said filter drum, slurry is drawn onto the filter cloth with at least a portion of the liquid passing through the openings into the fluid conduits while the solids form a filter cake on the filter cloth, and during another phase of each rotation high velocity gas passes from the conduits through the circumferential openings to lift the filter cake from the filter cloth, the improvement comprising a pair of substantially toroidal liquid collection means disposed at opposite ends of said drum, each of said collection means including a series of circumferentially disposed chambers, each of said chambers communicating with the terminus of a lag fluid conduit and having a venting means, whereby during one phase of each rotation, high velocity gas passes through certain of the conduits to force residual liquid in the conduits into the chambers and to lift the filter cake from the filter cloth, while during another phase of each rotation of said filter drum, slurry is drawn onto the filter cloth, the solids forming a filter cake with at least a portion of the liquid passing therethrough to filtrate storage together with liquid from at least one of said chambers.

* * * * *